Patented Oct. 12, 1943

2,331,376

UNITED STATES PATENT OFFICE 2,331,376

REACTION PRODUCT OF AN ALDEHYDE AND A BIGUANIDO CARBOCYCLIC SULPHONAMIDE

Gaetano F. D'Alelio, Pittsfield, Mass., assignor to General Electric Company, a corporation of New York No Drawing. Application February 26, 1941, Serial No. 380,671

17 Claims. (Cl. 260—69)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a compound of the class consisting of (1) nuclearly poly-substituted carbocyclic compounds wherein at least one of the nuclear substituents is a grouping represented by the formula

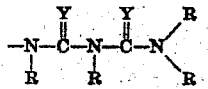

and at least one of the other nuclear substituents is a grouping represented by the formula

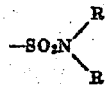

R in each of the above formulas representing a member of the class consisting of hydrogen and monovalent organic radicals, specifically monovalent hydrocarbon radicals, at least one Y representing the grouping =NH and the other Y representing a member of the class consisting of oxygen, sulphur, selenium and the grouping =NR', where R' has the same meaning as R, (2) the addition salts (organic and inorganic acid addition salts) of the nuclearly poly-substituted carbocyclic compounds of (1), and (3) mixtures of the nuclearly poly-substituted carbocyclic compounds of (1) and addition salts thereof.

In carrying the present invention into effect I may use, for example, nuclearly poly-substituted carbocyclic compounds corresponding to the formula

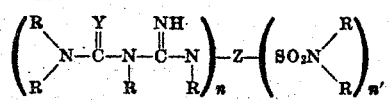

where R represents a member of the class consisting of hydrogen and monovalent organic radicals, specifically monovalent hydrocarbon radicals, Y represents a member of the class consisting of oxygen, sulphur, selenium and the grouping =NR', where R' has the same meaning as R, Z is a carbocyclic nucleus, n and n' are integers and each is at least 1, the sum of n and n' ranging from 2 to the combining power of (that is, to the number of replaceable hydrogen atoms in) the carbocyclic nulceus. I also may use nuclearly poly-substituted carbocyclic compounds corresponding to the formula

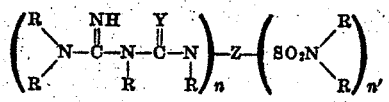

where R, Y, Z, n and n' have the meanings above given. The addition salts of these nuclearly poly-substituted carbocyclic compounds or mixtures of these compounds and of addition salts thereof also may be used in obtaining the new condensation products of this invention.

More specific examples of nuclearly poly-substituted carbocyclic compounds that may be employed in producing my new condensation products are nuclearly poly-substituted carbocyclic compounds wherein at least one of the nuclear substituents is a grouping represented by the formula

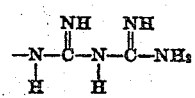

and at least one of the other nuclear substituents is a grouping represented by the formula —SO₂NH₂ and the organic and inorganic addition salts of such compounds, for instance the biguanido benzene sulphonamides and addition salts thereof. More specific examples of biguanido benzene sulphonamides and addition salts thereof are the mono-, di-, tri-, tetra- and penta-(biguanido) benzene monosulphonamides, the mono-(biguanido) benzene di-, tri-, tetra-, and penta-sulphonamides, the di-(biguanido) benzene di-, tri- and tetra-sulphonamides, the tri-(biguanido) benzene di- and tri-sulphonamides, tetra-(biguanido) benzene disulphonamide, and the organic salts, e. g., the oxalates, acetates, chloracetates, acrylates, etc., and the inorganic salts, e. g., the chlorides, sulphates, phosphates, etc., of such biguanido benzene sulphonamides.

Other examples of biguanido carbocyclic sulphonamides are the oxybiguanido benzene sulphonamides, which also may be named the (carbamyl guanido) benzene sulphonamides, the thiobiguanido benzene sulphonamides, which also may be named the (thiocarbamyl guanido) benzene sulphonamides, and the selenobiguanido benzene sulphonamides, which also may be named the (selenocarbamyl guanido) benzene sulphonamides. These oxy, thio and seleno derivatives may contain varying numbers of biguanido and sulphamyl radicals attached to the benzene nucleus as described above with particular reference to the biguanido benzene sulphanomides. Other examples of biguanido carbocyclic sulphonamides are the cyclo-aliphatic (cycloalkane and cycyloalkene) derivatives, e. g., the biguanido cycloaliphatic sulphonamides, the (carbamyl guanido cycloaliphatic sulphonamides, the (thiocarbamyl guanido) cycloaliphatic sulphonamides and the (selencarbamyl guanido) cycloaliphatic sulphonamides; the naphthalene derivatives, e. g., the biguanido, the (carbamyl guanido), the (thiocarbamyl guanido) and the (selenocarbamyl guanido) naphthalene sulphonamides; and the anthracene derivatives, e. g., the biguanido, the (carbamyl guanido), the (thiocarbamyl guanido) and the (selenocarbamyl guanido) anthracene sulphonamides; etc. In these carbocyclic compounds the number of biguanido and sulphamyl radicals attached to the carbocyclic nucleus may range from one each such radical to the combining power of the particular carbocyclic nucleus, that is, to the number of replaceable hydrogen atoms in the carbocyclic nucleus.

Certain of the nuclearly poly-substituted carbocyclic compounds and addition salts thereof that are used in carrying the present invention into effect are more fully described in my copending application Serial No. 380,670, filed concurrently herewith and assigned to the same assignee as the present invention.

The present invention is based on my discovery that new and valuable materials of particular utility in the plastics and coating arts can be produced by effecting reaction between ingredients comprising essentially an aldehyde, including polymeric aldehydes and aldehyde-addition products, and a biguanido (including oxybiguanido, thiobiguanido and selenobiguanido) carbocyclic sulphonamide, numerous examples of which have been given above and in my above-identified copending application. The initial condensation may be carried out at normal or at elevated temperatures, at atmospheric, sub-atmospheric or superatmospheric pressure and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. Good results are obtained by causing the condensation reaction between the primary components to take place in the presence of a primary condensation catalyst and a secondary condensation catalyst. Condensation products of excellent time- or storage-stability characteristics are obtained by using as the primary catalyst a member of the class consisting of (1) nitrogen-containing basic tertiary compounds that are aldehyde-non-reactable, e. g., tertiary amines such as trialkyl (e. g., trimethyl, triethyl, etc.) amines, triaryl (e. g., triphenyl, etc.) amines, etc., and (2) nitrogen-containing basic compounds that are aldehyde-reactable, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of primary catalyst, should be a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulphuric, phosphoric, acetic, lactic, acrylic, malonic, etc., or acid salts such as sodium acid sulphate, monosodium phosphate, monosodium phthalate, etc. Mixtures of acids, of acid salts or of acids and of acid salts may be employed if desired.

The reaction between the biguanido carbocyclic sulphonamide and the aldehyde, e. g., formaldehyde, may be carried out in the presence of solvents or diluents, fillers, other natural or synthetic resinous bodies, or while admixed with other materials which also can react with the aldehyde reactant or with the biguanido carbocyclic sulphonamide, e. g., ketones, urea, thiourea, selenourea, iminourea (guanidine), substituted ureas, thioureas, selenoureas and iminoureas, numerous examples of which are given in various copending applications of mine, for instance in copending application Serial No. 363,037, filed October 26, 1940, now Patent No. 2,322,566, issued June 22, 1943; monoamides of monocarboxylic and polycarboxylic acids and polyamides of polycarboxylic acids, e. g., acetamide, halogenated acetamides, maleic monoamide, malonic monoamide, phthalic monoamide, maleic diamide, fumaric diamide, malonic diamide, itaconic diamide, succinic diamide, phthalic diamide, the monoamide, diamide and triamide of citric acid, the monoamide, diamide and triamide of tricarballylic acid, etc.; 5-membered aminotriazines, which compounds also may be named aminotriazoles (amidogentriazoles) and aminotriazines (amidogentriazines), e. g., melamine, ammeline, ammelide, numerous other examples being given in various copending applications of mine, for instance in copending application Serial No. 377,524, filed February 5, 1941, and in applications referred to in said copending application; aminodiazines and aminodiazoles; phenol and substituted phenols; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like. These modifying reactants may be incorporated with the biguanido carbocyclic sulphonamide and the aldehyde by mixing all the reactants and effecting condensation therebetween or by various permutations of the reactants as described, for example, in my copending application Serial No. 363,037 with particular reference to reactions involving a urea, an aldehyde and oxanilic acid.

Some of the condensation products of this invention are thermoplastic materials while others are thermosetting or potentially thermosetting bodies which convert under heat or under heat and pressure to an insoluble, infusible state. In general, the lesser the number of hydrogen atoms in the biguanido and sulphamyl substituents attached to the carbocyclic nucleus of the starting compound, the more the condensation product of said compound with an aldehyde, specifically formaldehyde, will tend to soften under heat; and the greater the number of hydrogen atoms in the bi-guanido and sulphamyl substituents of the starting compound, the more the ultimate condensation product tends to be (or is) of a thermosetting nature. The thermoplastic condensation products are of particular utility as plasticizers for other synthetic resins. The thermosetting or potentially thermosetting condensation products, alone or mixed with fillers, pigments, dyes, lubricants, plasticizers, etc., may be used, for example, in the production of molding compositions.

Depending upon the particular reactants employed and the particular conditions of reaction, the intermediate or partial condensation products vary from clear, colorless or colored, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentration. The heat-convertible or potentially heat-convertible resinous condensation products may be used in liquid state, for instance, as surface coating materials, in the production of paints, varnishes, lacquers, enamels, etc., for general adhesive applications, in producing laminated articles and for numerous other purposes. The liquid, heat-hardenable or potentially heat-hardenable condensation products also may be used directly as casting resins, while those which are of a gel-like nature in partially condensed state may be dried and granulated to form clear, unfilled, heat-convertible resins.

In order that those skilled in the art better may understand how this invention may be carried into effect, the following examples are given by way of illustration. All parts are by weight.

Example 1

| | Parts |
|---|---|
| Biguanido sulphanilamide | 25.6 |
| Aqueous solution of formaldehyde (approximately 37.1% HCHO) | 243.0 |
| Sodium hydroxide in 2.5 parts water | 0.05 | were heated together at the boiling temperature of the mixture, under reflux, for one hour. A clear syrup having a pH of 7.7 was obtained. When a small sample of this syrup was heated on a 140° C. hot plate, it readily cured to a hard resin. The curing of this syrup is accelerated by the addition of direct or active curing catalysts (e. g., phthalic anhydride, citric acid, etc.) or of latent curing catalysts (e. g., sodium chloracetate, diethyl chloracetamide, ethyl glycine ester hydrochloride, etc.) or by intercondensation with curing reactants (e. g., mono-, di- and tri-chloracetamides, chloracetonitrile, alpha beta dibrompropionitrile, aminoacetamide hydrochloride, aminoacetonitrile hydrochloride, ethylene diamine monohydrochloride, diethanol amine hydrochloride, nitrourea, glycine, sulphamic acid, chloracetyl urea, chloracetone, etc. Other examples of active and latent curing catalysts and of curing reactants that may be employed to accelerate or to effect the curing of the thermosetting or potentially thermosetting resins of this and other examples are given in various copending applications of mine, for instance in copending application Serial No. 346,962, filed July 23, 1940, now Patent No. 2,325,375, and Serial No. 354,395, filed August 27, 1940, now Patent No. 2,325,376, both of which applications issued on July 27, 1943, and are assigned to the same assignee as the present invention.

Example 2

To a partial condensation product of formaldehyde and biguanido sulphanilamide produced as described under Example 1 was added 1 part of a halogenated acetamide, specifically chloracetamide (monochloracetamide), and the resulting mixture was heated under reflux at boiling temperature for 10 minutes to effect intercondensation of the chloracetamide with the said partial condensation product. The hot resinous syrup was mixed with 70 parts alpha cellulose in flock form and 0.4 part of a mold lubricant, specifically zinc stearate, to form a molding (moldable) compound. The wet compound was dried at 50° C. for one hour and at room temperature (30° C.) for 40 hours. The dried compound was molded for 10 minutes at 130° C. under a pressure of 2,000 pounds per square inch. The molded article was well cured throughout and showed good flow characteristics during molding.

Example 3

| | Parts |
|---|---|
| Biguanido sulphanilamide | 25.6 |
| Urea | 54.0 |
| Aqueous solution of formaldehyde (approximately 37.1% HCHO) | 324.0 |
| Sodium hydroxide in 5 parts water | 0.1 | were heated together under reflux for one hour, yielding a clear syrup having a pH of 8.77. An insoluble, infusible resin was obtained when small samples of this syrup were treated with active or latent curing catalysts or intercondensed with curing reactants, as described under Example 1, followed by heating on a 140° C. hot plate.

Two hundred and thirty parts of the above urea-biguanido sulphanilamide-formaldehyde partial condensation product and 2 parts of chloracetamide were heated together under reflux for 10 minutes to cause the latter to intercondense with the former. The resulting hot syrup was mixed with 70 parts alpha cellulose in flock form and 0.5 part zinc stearate to form a molding compound. The wet compound was dried for 1 hour at 50° C. and for 3½ hours at 78° C. The dried compound was molded as described under Example 2, yielding molded pieces that were excellently cured throughout and that showed good plastic flow characteristics during molding.

A part of the urea in the above formula may be replaced by other formaldehyde-reactable substances, for example by an aminotriazine, specifically melamine.

Example 4

| | Parts |
|---|---|
| Biguanido sulphanilamide | 25.6 |
| Aminotriazine, specifically melamine | 113.4 |
| Aqueous solution of formaldehyde (approximately 37.1% HCHO) | 324.0 |
| Sodium hydroxide in 5 parts water | 0.1 | were heated together under reflux for 1 hour, yielding a clear, viscous syrup having a pH of 9.75. This syrup did not exhibit any appreciable tendency to gel as the ordinary melamine-formaldehyde syrups often do. When a small sample of the syrup was heated on a 140° C. hot plate, it cured slowly to an insoluble, infusible state. The curing of the resinous syrup was accelerated by the addition of active or latent curing catalysts or by intercondensation with curing reactants.

Two parts chloracetamide were intercondensed with 230 parts of the syrup as described under Example 3. A molding compound was prepared from the resulting syrup, following the same procedure and using the same proportions of components as in Example 3 with the exception that the drying time of the wet compound was 1 hour at 50° C. and 40 hours at room temperature. The dried compound was molded for 4 minutes at 130° C. and at 2,000 pounds per square inch pressure. The molded pieces were excellently cured throughout and had outstanding water resistance, as evidenced by the fact that they showed no signs of disintegration or any appreciable surface alteration when immersed in boiling water for 15 minutes. The compound also showed excellent plastic flow during molding, being much better in this respect than molding compounds similarly made from a melamine-formaldehyde resin.

A part of the melamine in the above formula may be replaced by other formaldehyde-reactable substances, e. g., by urea, thiourea, selenourea, iminourea, maleic diamide, monoamide or diamide of phthalic acid, mono-, di- or tri-amide of citric acid, etc.

Example 5

| | Parts |
|---|---|
| Biguanido sulphanilamide | 25.6 |
| Furfural | 57.6 |
| Water | 100.0 |
| Sodium hydroxide in 5 parts water | 0.1 | were heated together at the boiling temperature of the mass, under reflux, for 15 minutes to yield a viscous resinous syrup. When a small sample of this syrup was heated on a 140° C. hot plate, it cured to an insoluble infusible state. The curing of the resin was accelerated by the addition of direct or latent curing catalysts or by intercondensation with curing reactants.

Example 6

| | Parts |
|---|---|
| Biguanido sulphanilamide | 25.6 |
| Acrolein | 33.6 |
| Sodium hydroxide in 5 parts water | 0.1 |
| Water | 100.0 | were heated together for 15 minutes under reflux, yielding a syrupy mass having curing characteristics much the same as the product of Example 5. The cured resin was hydrophobic.

Example 7

| | Parts |
|---|---|
| Biguanido sulphanilamide | 25.6 |
| Aqueous solution of formaldehyde (approximately 37.1% HCHO) | 129.6 |
| Butyl alcohol | 37.0 |
| Sodium hydroxide in 5 parts water | 0.1 | were heated together under reflux for 15 minutes. The resulting syrup was clear, with a small amount of precipitated resin. An insoluble, infusible resin was obtained when a small sample of the syrup was heated on a 140° C. hot plate. The syrup cured more rapidly when treated with direct or latent curing catalysts or with curing reactants.

Example 8

| | Parts |
|---|---|
| Biguanido sulphanilamide | 25.6 |
| Acetamide | 5.9 |
| Aqueous solution of formaldehyde (approximately 37.1% HCHO) | 129.6 |
| Sodium hydroxide in 5 parts water | 0.1 | were refluxed together for 15 minutes, yielding a clear, viscous syrup. Concentration of this syrup left a thick, clear, resinous mass that was potentially heat-curable. The addition of direct or active curing catalysts or intercondensation with curing reactants yielded a resin that could be converted to an insoluble, infusible state, upon heating at 140° C. The concentrated syrup may be used as a plasticizer for other aminoplasts, e. g., urea-aldehyde resins, aminotriazine-aldehyde resins, protein-aldehyde resins, etc., additional examples of aminoplasts being given in, for example, my copending application Serial No. 374,736, filed January 16, 1941, now Patent No. 2,327,772, issued Aug. 24, 1943, and assigned to the same assignee as this invention.

Example 9

| | Parts |
|---|---|
| Biguanido sulphanilamide | 25.6 |
| Diethyl malonate | 16.0 |
| Aqueous solution of formaldehyde (37.1% HCHO) | 129.6 |
| Sodium hydroxide in 5 parts water | 0.1 | were heated together under reflux for 15 minutes. A clear syrup was obtained. Concentration of this syrup by heating at 120° C. yielded a very viscous resin that was insoluble in water, ethyl alcohol and Solvatone (mixture of 80% acetone, 10% toluene and 10% isopropyl alcohol). This resin was similar in its curing and plasticizing characteristics to the concentrated resinous syrup of Example 8 and, like the resin of that example, also may be used as a plasticizer for aminoplasts.

Example 10

| | Parts |
|---|---|
| Biguanido sulphanilamide | 25.6 |
| Glycerine | 9.2 |
| Aqueous solution of formaldehyde (approximately 37.1% HCHO) | 129.6 |
| Sodium hydroxide in 5 parts water | 0.1 | were heated together under reflux for 15 minutes. Samples of the resulting syrup, when treated with direct or latent curing catalysts or with curing reactants, e. g., chloracetamide, on a 140° C. hot plate, converted to hard, infusible resins. The heat-convertible syrup possesses excellent plasticizing characteristics and appears to plasticize aminoplasts even better than the products of Examples 8 and 9.

Example 11

| | Parts |
|---|---|
| Biguanido sulphanilamide | 25.6 |
| Polyvinyl alcohol | 26.4 |
| Aqueous solution of formaldehyde (approximately 37.1% HCHO) | 388.8 |
| Sodium hydroxide in 5 parts water | 0.1 | were refluxed for 15 minutes, yielding a very viscous syrup. Samples of this syrup were heated on a 140° C. hot plate to obtain tough, thermoplastic resins. When the pH of the syrup is lowered by the addition of hydrochloric acid, the resulting resin cures rapidly on a 140° C. hot plate to an insoluble, infusible state.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes which may be used are acetaldehyde, propionaldehyde, butyraldehyde, methacrolein, crotonaldehyde, benzaldehyde, furfural, etc., mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives, of urea, thiourea, selenourea and iminourea, and of substituted ureas, thioureas, selenoureas and iminoureas (numerous examples of which are given in my copending application Serial No. 377,524), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of amidogentriazines, numerous examples of which are given in my copending application Serial No. 377,524. Particularly good results are obtained with active methylene-containing bodies such as mono- and di-methylol ureas and the methylol melamines, e. g., mono- di-, tri-, tetra-, penta- and hexa-methylol melamines. Mixtures of aldehydes and active methylene-containing bodies may be employed, e. g., mixtures of formaldehyde and methylol compounds such, for instance, as dimethylol urea and trimethylol melamine.

The ratio of the aldehydic reactant to the biguanido carbocyclic sulphonamide may be varied over a wide range, but ordinarily the reactants are employed in an amount corresponding to at least one mol of the aldehyde, specifically formaldehyde, for each mol of the biguanido carbocyclic sulphonamide. Thus I may use, for example, from one to four or five mols of an aldehyde for each mol of the biguanido carbocyclic sulphonamide. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example up to ten or twelve mols of such alkylol derivatives for each mol of the biguanido carbocyclic sulphonamide. If the biguanido carbocyclic sulphonamide contains only two unsubstituted amidogen (—NH₂) groups (or one unsubstituted and two partly substituted amidogen groups), then one advantageously may use from two to three mols aldehyde for each mol of the biguanido carbocyclic sulphonamide; but if the sulphonamide compound contains only one unsubstituted amidogen group (or two partly substituted amidogen groups), then no particular advantage usually accrues from using more than about one to one and one-half mols aldehyde for each mol of such biguanido carbocyclic sulphonamide.

As indicated hereinbefore, and as further shown by a number of the examples, the properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, butyl, amyl, etc., alcohols; polyhydric alcohols such as ethylene glycol, diethylene glycol, glycerine, pentaerythritol, etc.; amides such as formamide, stearamide, acrylamide, benzamide, toluene sulphonamides, benzene disulphonamides, benzene trisulphonamides, adipic diamide, phthalamide, etc.; amines such as ethylene diamine, aniline, phenylene diamine, etc.; phenol and substituted phenols, including aminophenols, etc.; ketones, including halogenated ketones; nitriles, e. g., acrylonitrile, methacrylonitrile, succinonitrile, including halogenated nitriles, etc.; and others.

The modifying bodies also may take the form of high molecular weight bodies with or without resinous characteristics, for example hydrolyzed wood products, formalized cellulose derivatives, lignin, protein-aldehyde condensation products, resinous reaction products of aldehydes, for example formaldehyde, with the aminotriazoles (e. g., guanazole, phenyl guanazole, etc.), alone or admixed with, for example, urea, melamine, or urea and melamine, resins obtained by reaction of an aldehyde with the aminodiazines (e. g., 2, 4, 6-triaminopyrimidine, 2,4-diaminoquinazoline, etc.), the aminotriazines or the aminodiazoles, alone or admixed with, for example, urea, melamine or urea and melamine. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers including polyvinyl acetals, specifically polyvinyl formal, etc.

Instead of effecting reaction between a biguanido carbocyclic sulphonamide and an aldehyde, e. g., formaldehyde, I may cause an aldehyde to condense with a salt of a biguanido carbocyclic sulphonamide or with a mixture of a biguanido carbocyclic sulphonamide and a salt (organic or inorganic) thereof. Numerous examples of such salts are given in my copending application Serial No. 377,524, of which the following are here mentioned by way of illustration: salts of biguanido carbocyclic sulphonamides and organic or inorganic acids as, for instance, hydrochloric, hydrobromic, hydroiodic, sulphuric, phosphoric, boric, selenic, chromic, acetic, chloracetic, propionic, butyric, valeric, caproic, acrylic, polyacrylic, methacrylic, polymethacrylic, oxalic, malonic, succinic, adipic, malic, maleic, fumaric, benzoic, salicylic, camphoric, phthalic, etc. Acid salts also may be used in preparing the salts of the biguanido carbocyclic sulphonamides. In my copending application Serial No. 380,672, filed concurrently herewith and assigned to the same assignee as the present invention, I have disclosed and claimed compositions comprising an aminoplast modified either with a salt of certain of the nuclearly poly-substituted carbocyclic compounds herein described or with the product of reaction of an aldehyde with such a salt.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional methods to provide various thermoplastic and thermosetting molding compositions.

The thermosetting molding compositions of this invention are usually molded at temperatures of the order of 100° to 200° C. and at pressures of the order of 1,000 to 5,000 pounds or more per square inch.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the reaction product of ingredients comprising an aldehyde and a compound of the class consisting of (1) nuclearly poly-substituted carbocyclic compounds wherein at least one of the nuclear substituents is a grouping represented by the formula

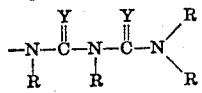

and at least one of the other nuclear substituents is a grouping represented by the formula

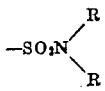

R in each of the above formulas representing a member of the class consisting of hydrogen and monovalent hydrocarbon radicals, at least one Y representing the grouping =NH and the other Y representing a member of the class consisting of oxygen, sulphur, selenium and the grouping =NR', where R' has the same meaning as R, (2) the addition salts of the nuclearly poly-substituted carbocyclic compounds of (1), and (3) mixtures of the nuclearly poly-substituted carbocyclic compounds of (1) and addition salts thereof.

2. A composition as in claim 1 wherein the aldehyde is formaldehyde.

3. A composition comprising a condensation product of ingredients comprising an aldehyde and a biguanido benzene sulphonamide.

4. A composition comprising a condensation product of ingredients comprising an aldehyde and a (carbamyl guanido) benzene sulphonamide.

5. A composition comprising a condensation product of ingredients comprising a (carbamyl guanido) benzene sulphonamide, an alcohol and an aldehyde.

6. A resinous composition comprising the product of reaction of ingredients comprising biguanido sulphanilamide and formaldehyde.

7. A resinous composition comprising the product of reaction of ingredients comprising (carbamyl guanido) sulphanilamide and formaldehyde.

8. A heat-curable resinous condensation product of ingredients comprising a biguanido benzene sulphonamide and formaldehyde.

9. A product comprising the heat-cured resinous condensation product of claim 8.

10. A composition comprising an alkaline-catalyzed condensation product of ingredients comprising an aldehyde and a biguanido benzene sulphonamide.

11. A composition comprising an alcohol-modified condensation product of ingredients comprising an aldehyde and a biguanido benzene sulphonamide.

12. A composition comprising the product of reaction of ingredients comprising urea, biguanido sulphanilamide and formaldehyde.

13. A composition comprising the product of reaction of ingredients comprising melamine, biguanido sulphanilamide and formaldehyde.

14. A heat-curable composition comprising the heat-convertible product of reaction of (1) a partial condensation product of ingredients comprising urea, biguanido sulphanilamide and formaldehyde and (2) a chlorinated acetamide.

15. A product comprising the heat-cured composition of claim 14.

16. The method of preparing new condensation products which comprises effecting reaction between ingredients comprising an aldehyde and a compound of the class consisting of (1) nuclearly poly-substituted carbocyclic compounds wherein at least one of the nuclear substituents is a grouping represented by the formula

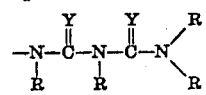

and at least one of the other nuclear substituents is a grouping represented by the formula

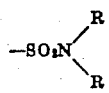

R in each of the above formulas representing a member of the class consisting of hydrogen and monovalent hydrocarbon radicals, at least one Y representing the grouping =NH and the other Y representing a member of the class consisting of oxygen, sulphur, selenium and the grouping =NR', where R' has the same meaning as R, (2) the addition salts of the nuclearly poly-substituted carbocyclic compounds of (1), and (3) mixtures of the nuclearly poly-substituted carbocyclic compounds of (1) and addition salts thereof.

17. A composition comprising a condensation product of ingredients comprising a urea, an aldehyde and a biguanido benzene sulphonamide.

GAETANO F. D'ALELIO.

CERTIFICATE OF CORRECTION.

Patent No. 2,331,376.  October 12, 1943.

GAETANO F. D'ALELIO.

It is hereby certified that error appears in the printed specification of the above numbered patent requiring correction as follows: Page 1, second column, line 2, for "nulceus" read --nucleus--; page 2, first column, line 5, for "sulphanomides" read --sulphonamides--; line 9, after "guanido" insert a closing parenthesis; line 11, for "selencarbamyl" read --selenocarbamyl--; and second column, line 19, for "aldehyde" read --aldehydic--; line 71, for "bi-guanido" read --biguanido--; and that the said Letters Patent should be read with this correction therein that the same may conform to the record of the case in the Patent Office.

Signed and sealed this 14th day of December, A. D. 1943.

(Seal)

Henry Van Arsdale,
Acting Commissioner of Patents.